US012164836B2

(12) United States Patent
Child et al.

(10) Patent No.: US 12,164,836 B2
(45) Date of Patent: *Dec. 10, 2024

(54) SYSTEMS AND METHODS FOR A VOICE-CONTROLLED INTERACTIVE APPLICATION

(71) Applicant: Volley Inc., San Francisco, CA (US)

(72) Inventors: Maxwell Child, San Francisco, CA (US); James Wilsterman, San Francisco, CA (US)

(73) Assignee: Volley Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/507,781

(22) Filed: Nov. 13, 2023

(65) Prior Publication Data

US 2024/0329921 A1    Oct. 3, 2024

Related U.S. Application Data

(63) Continuation of application No. 18/191,661, filed on Mar. 28, 2023, now Pat. No. 11,886,773.

(51) Int. Cl.
 *G10L 15/22* (2006.01)
 *G06F 3/16* (2006.01)
 *G10L 15/26* (2006.01)
 *H04N 7/14* (2006.01)

(52) U.S. Cl.
 CPC .............. *G06F 3/167* (2013.01); *G10L 15/26* (2013.01); *H04N 7/14* (2013.01)

(58) Field of Classification Search
 CPC .. H04B 1/25; H04M 1/25; H04N 1/25; H04L 1/25; H04R 1/25; H04W 1/25
 See application file for complete search history.

(56) References Cited

U.S. PATENT DOCUMENTS

| | | | |
|---|---|---|---|
| 8,649,889 B2* | 2/2014 | Cacciolo, Jr. | G07F 17/3295 |
| | | | 700/91 |
| 9,256,396 B2* | 2/2016 | Monson | A63F 13/45 |
| 10,124,261 B1* | 11/2018 | Cardinale | A63F 13/80 |
| 10,636,253 B2* | 4/2020 | Lucas | A63F 13/54 |
| 11,580,982 B1* | 2/2023 | Karnawat | G10L 15/22 |
| 11,862,191 B2* | 1/2024 | Jansson | G06N 3/08 |
| 11,988,784 B2* | 5/2024 | Jones | G01S 7/539 |
| 2008/0154955 A1* | 6/2008 | Beaupre | G06F 16/48 |
| | | | 715/764 |
| 2013/0031216 A1* | 1/2013 | Willis | H04L 65/1069 |
| | | | 709/219 |
| 2014/0228125 A1* | 8/2014 | Tsang | A63F 13/798 |
| | | | 463/42 |
| 2017/0065872 A1* | 3/2017 | Kelley | H04W 4/80 |
| 2022/0374460 A1* | 11/2022 | Yu | G06N 20/00 |

* cited by examiner

*Primary Examiner* — Neeraj Sharma
(74) *Attorney, Agent, or Firm* — Esplin & Associates, PC

(57) ABSTRACT

Systems and methods to support an application that is voice-controlled are disclosed. Exemplary implementations may establish a synchronous two-way communication session between a first and a second user; present application information to the first and second user; detect first voice-control information from the first user and second voice-control information from the second user; control operations of the application based on the detected voice-control information; generate and/or determine results of the application based on the detected voice-control information; present the results to the users, and/or other steps.

18 Claims, 4 Drawing Sheets

SYSTEMS AND METHODS FOR A VOICE-CONTROLLED INTERACTIVE APPLICATION

FIELD OF THE DISCLOSURE

The present disclosure relates to systems and methods for voice-controlled interactive applications, and, in particular, software applications using synchronous communications between multiple users.

BACKGROUND

Applications for synchronous communications between multiple users are known.

SUMMARY

One aspect of the present disclosure relates to a system configured to support an application that is voice-controlled. The system may include electronic storage, one or more hardware processors, and/or other components. In some implementations, the system may establish a synchronous two-way communication session between a first and a second user. The system may present application information to the first and second user. The system may detect first voice-control information from the first user and second voice-control information from the second user. The system may control operations of the application based on the detected voice-control information. The system may generate and/or determine results of the application based on the detected voice-control information. The system may present the results to the users. In some implementations, the system may perform other steps.

Another aspect of the present disclosure related to a method of supporting an application that is voice-controlled. In some implementations, the method may include establishing a synchronous two-way communication session between a first and a second user. The method may include presenting application information to the first and second user. The method may include detecting first voice-control information from the first user and second voice-control information from the second user. The method may include controlling operations of the application based on the detected voice-control information. The method may include generating and/or determining results of the application based on the detected voice-control information. The method may include presenting the results to the users. In some implementations, the method may include performing other steps.

As used herein, any association (or relation, or reflection, or indication, or correspondency, or correlation) involving servers, processors, client computing platforms, users, communication sessions, challenges, results, voice-control information, instructions, requests, detections, determinations, verifications, presentations, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
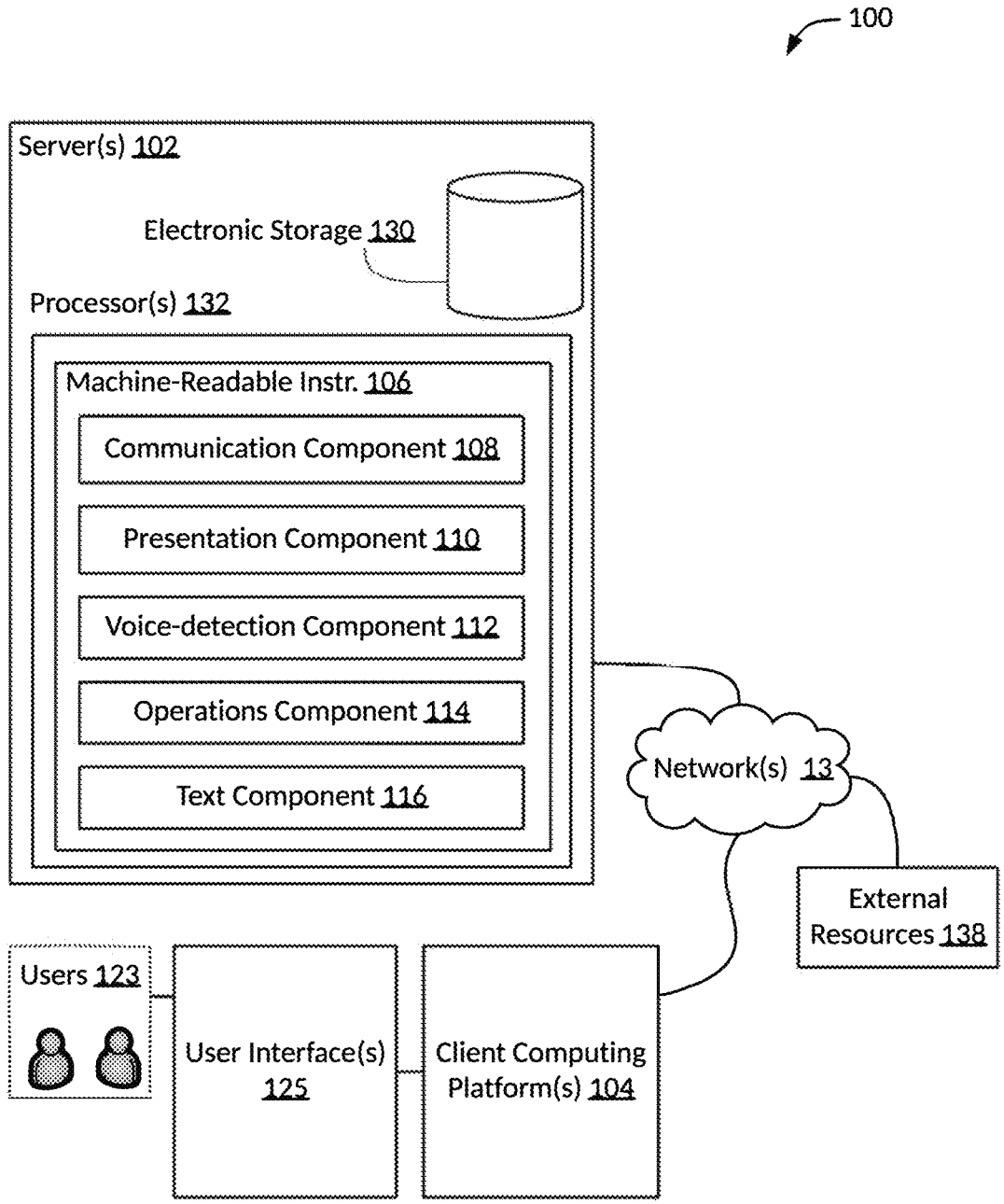
FIG. 1 illustrates a system configured to support a voice-controlled application, in accordance with one or more implementations.

FIG. 1 illustrates a system 100 configured to support a voice-controlled application, in accordance with one or more implementations. The (software) application may be interactive between multiple users 123, including a first user, a second user, and so forth. The application uses, implements, and/or otherwise supports synchronous communications between multiple users. Individual users may be associated with individual client computing platforms 104. Client computing platforms 104 may include a first client computing platform 104, a second client computing platform 104, and so forth. For example, the first user is associated with first client computing platform 104, the second user is associated with second client computing platform 104, and so forth. Instances of the application may execute and/or otherwise operate on the different client computing platforms 104. For example, the first user may use the application on first client computing platform 104, the second user may use the application on second client computing platform 104, and so forth. As a preliminary and non-limiting example, by virtue of the systems and methods described in this disclosure, users 123 may control a software application using voice information (also referred to as voice-control information) such that operations of the application are controlled through the voice(s) of different ones of users 123. This voice-controlled application may be used for (professional) collaboration among users 123, for shared creative purposes, for crowdsourcing intelligence purposes, for communicative purposes, for games and/or entertainment, and/or for other purposes. In some implementations, a voice-controlled application may be used by a single user who control settings and/or operations of the voice-controlled application through voice.

Referring to FIG. 1, system 100 may include one or more client computing platform(s) 104, user interface(s) 125, server(s) 102, external resource(s) 138, electronic storage 130, and/or other components. In some implementations, server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, system 100 may be configured to communicate with one or more of users 123, and/or other entities and/or components, e.g., through one or more networks 13.

Server(s) 102 may include electronic storage 130, processor(s) 132, machine-readable instructions 106, and/or other components. Server(s) 102 may be configured by machine-readable instructions 106. Machine-readable instructions 106 may include one or more instruction components. The instruction components may include computer program components. The instruction components may include one or more of a communication component 108, a presentation component 110, a voice-detection component 112, an operations component 114, a text component 116, and/or other instruction components.

Communication component 108 may be configured to establish communication sessions between users 123. In particular, communication component 108 may establish communication sessions between different client computing platforms 104 associated with different ones of users 123. For example, a particular communication session may be established between first client computing platform 104 associated with the first user and second client computing platform 104 associated with the second user. In some implementations, a communication session may be a synchronous two-way communication session. For example, a particular communication session may include two-way audio information (e.g., communicated between two users). Alternatively, and/or simultaneously, a given communication session may include two-way video information (e.g., communicated between two users). In some implementations, a communication session may be part of and/or otherwise included in the voice-controlled software application.

In some implementations, individual client computing platforms 104 may include microphones and loudspeakers. For example, a particular client computing platform 104 may be configured to capture audio information through its microphone and present certain information through its loudspeaker. For example, audio information captured by first client computing platform 104 may be presented to the second user through second client computing platform 104. Conversely, and simultaneously, audio information captured by second client computing platform 104 may be presented to the first user through first client computing platform 104.

In some implementations, individual client computing platforms 104 may include video cameras and digital displays. For example, a particular client computing platform 104 may be configured to capture video information through its video camera and present certain information through its digital display. For example, video information captured by first client computing platform 104 may be presented to the second user through second client computing platform 104. Conversely, and simultaneously, video information captured by second client computing platform 104 may be presented to the first user through first client computing platform 104.

Presentation component 110 may be configured to present information to users 123, particularly through client computing platforms 104. In some implementations, this information may include (software) application information. In some implementations, at least some portion of this information may be presented simultaneously to different ones of users 123 (e.g., through their respective client computing platforms 104). In some implementations, at least some portion of the presented information represents a challenge to one or more of users 123. As used herein, a challenge may be related to a quest, prompt, goal, evaluation, opinion, decision, and/or other purpose, and may or may not have a previously-determined correct result. In some cases, a challenge is used to prompt feedback and/or other input from a user. For example, the presented information may include audio information that is a portion of a song, and the challenge may be based on recognizing one or both of the artist and the title of the song. For this type of challenge, a correct result is known beforehand. For example, the presented information may include a digital canvas configured to be drawn upon by at least one of the users of a particular communication session, and the challenge may be based on identifying the drawing. In some implementations, both the first user and the second user are presented simultaneously with a drawing that is being drawn on the digital canvas. In some cases, the presented information may include audio information and/or image information to be recognized without having a previously-determined correct result. For example, one or more users may rate an image or depiction (e.g., on quality or beauty), or the voice-controlled software application may use crowd-sourcing to determine the most likely result for the presented information based on feedback and/or opinions of one or more users. Such user-provided opinions or user-provided evaluation could be used, e.g., to annotate training data for machine learning purposes. In some cases, the presented information may include video information and/or animated information (e.g., in a video game), and one or more users may be challenged to decide what should happen next (e.g., to a particular object or character). Here, the resulting decision may not be known beforehand.

Voice-detection component 112 may be configured to detect voice information (also referred to as voice-control information) within communication sessions. In particular, voice-detection component 112 may detect user-specific voice information within a two-way communication session. For example, voice-detection component 112 may detect first voice information from the first user, second voice information from the second user, and so forth. Detection by voice-detection component 112 may be based on audio analysis of audio signals captured by microphones of client computing platforms 104 that are taking part in a particular communication sessions (particularly, a communication session as established by communication component 108). In some implementations, voice-detection component 112 may detect individual words in a detected segment of speech or in a detected phrase or sentence. In some implementations, voice-detection component 112 may detect voice information during use of a voice-controlled software application, for one or more users.

Operations component 114 may be configured to control operations of one or more software applications, including but not limited to the voice-controlled application. Control by operations component 114 may be based on voice information, e.g., as detected by voice-detection component 112. For example, performance of conditional operations may be based on at least one of first voice information from the first user, second voice information from the second user, etc. In some implementations, operations component 114 may be configured to control a particular action or (conditional) operation of the voice-controlled application, based on voice information. In some implementations, operations component 114 may be configured to generate, produce, and/or otherwise determine one or more results of the voice-controlled application based on voice information. Operations component 114 may perform this generation, production, and/or determination automatically, programmatically, and/or autonomously (i.e., without real-time human or manual intervention). The one or more results may correspond to and/or otherwise be related to the challenge represented in the information presented by presentation component 110. For example, a particular result may be whether a particular user correctly identified a particular song. For example, a particular result may be whether a particular user correctly identified a particular drawing. For example, a particular result may include a score, a ranking, a celebratory message, and/or other information related to challenges and/or other types of competition among users 123. As an example of controlling operations in a particular software application, a user could change a brushes type, width, and/or color through voice information in a drawing or art application.

In some implementations, presentation component 110 may be configured to effectuate presentations of one or more results (from operations component 114) to one or more users 123. For example, the one or more results may be presented to the first user on first client computing platform 104, to the second user on second client computing platform 104, and so forth. In some cases, the same information related to challenges and/or other types of competition among users 123 may be presented to multiple ones of users 123. Presentations may include audio information, video information, images, graphics, animations, textual information, and/or combinations thereof.

Text component 116 may be configured to convert voice information into textual information. For example, text component 116 may convert first voice information from the first user into textual information, including, e.g., a first set of words. For example, text component 116 may convert second voice information from the second user into different textual information, including, e.g., a second set of words. In some implementations, operations by operations component 114 may be based on this textual information. For example, one or more of the results may be based on particular words in the textual information.

In some implementations, operations component 114 includes a game engine. In some implementations, operations component 114 is part of a game engine. The game engine may control the challenges, the corresponding results, and/or the presentation of results to users 123.

In some implementations, certain operations may be accomplished through user interfaces 125. In particular, operations pertaining to or otherwise involving a particular user may be accomplished or controlled or initiated through a particular user interface 125 of a particular client computing platform 104, where the particular client computing platform 104 is associated with the particular user. In other words, the particular user may interact with an instance of the voice-controlled application through the particular user interface 125. User interfaces 125 may provide an interface through which users 123 provide information to and/or receive information from system 100. In some implementations, user interface 125 may include one or more of a display screen, touchscreen, monitor, a keyboard, buttons, switches, knobs, levers, mouse, microphones, image sensors, video cameras, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100.

Figure 3:
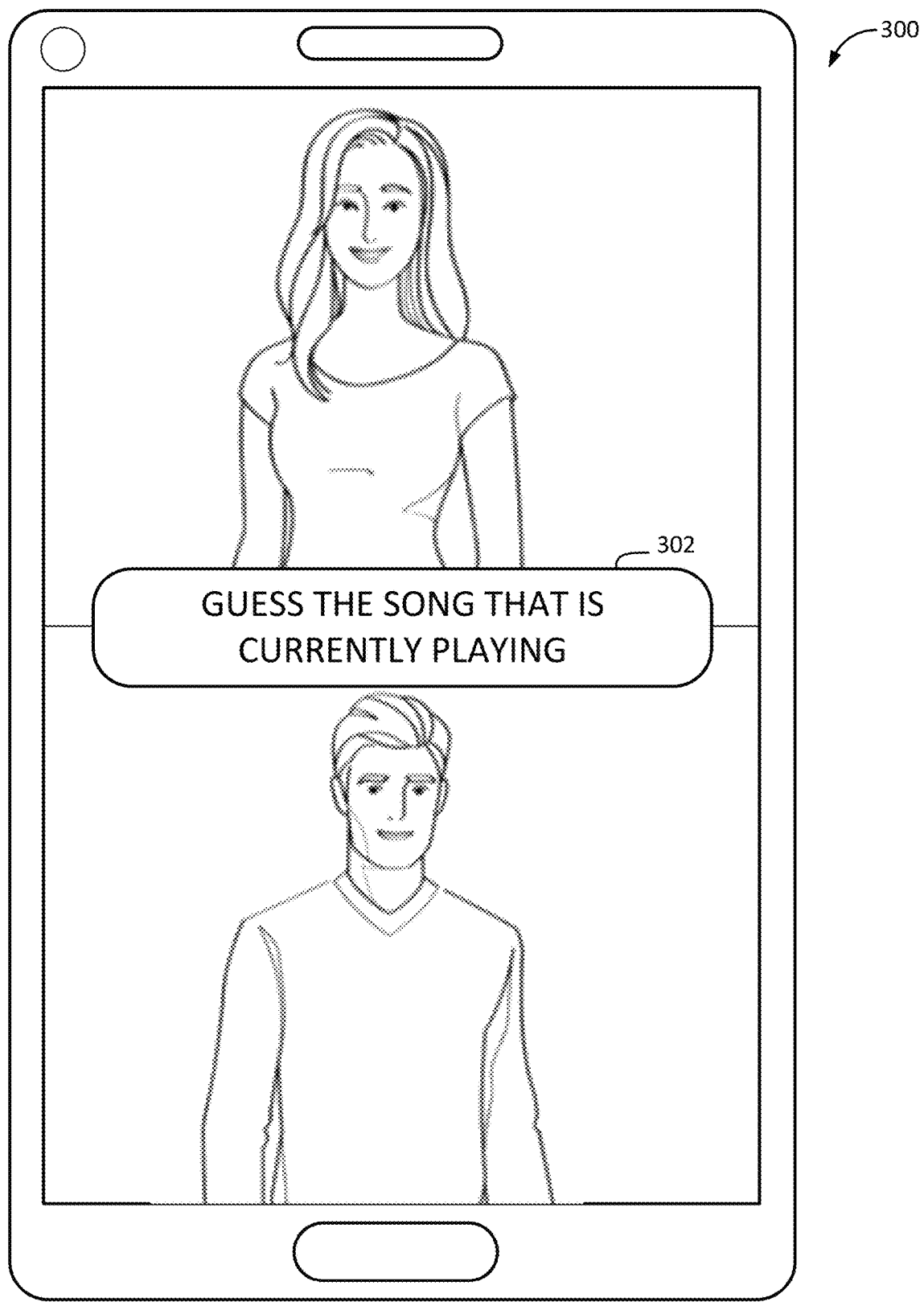
FIG. 3 illustrates an example implementation of a user interface, as may be used by a system configured to support a voice-controlled application, in accordance with one or more implementations.

Presentation component 110 may be configured to present interfaces (e.g., user interfaces 125) to users 123, particularly through client computing platforms 104. FIG. 3 illustrates an example implementation of a user interface 300 as may be used by system 100, in accordance with one or more implementations, and presented on one or more client computing platforms such as (portable) computing devices. User interface 300 may enable or support a communication session (here, a video chat) between two users (say, "Alice", depicted in the top half of user interface 300, and "Bob", depicted in the bottom half of user interface 300). User interface 300 may include one or more (graphical) user interface elements, including a notification element 302 labeled "Guess the song that is currently playing", which corresponds to a current (audio) challenge to Alice and Bob. Voice information from Alice and/or Bob may control this challenge. Generated results for this challenge may be based on voice information from Alice and/or Bob (e.g., Alice may guess the correct song title and/or Bob may guess the correct song artist). Similar user interfaces may be presented simultaneously to Alice and Bob on their respective computing devices.

Figure 4:
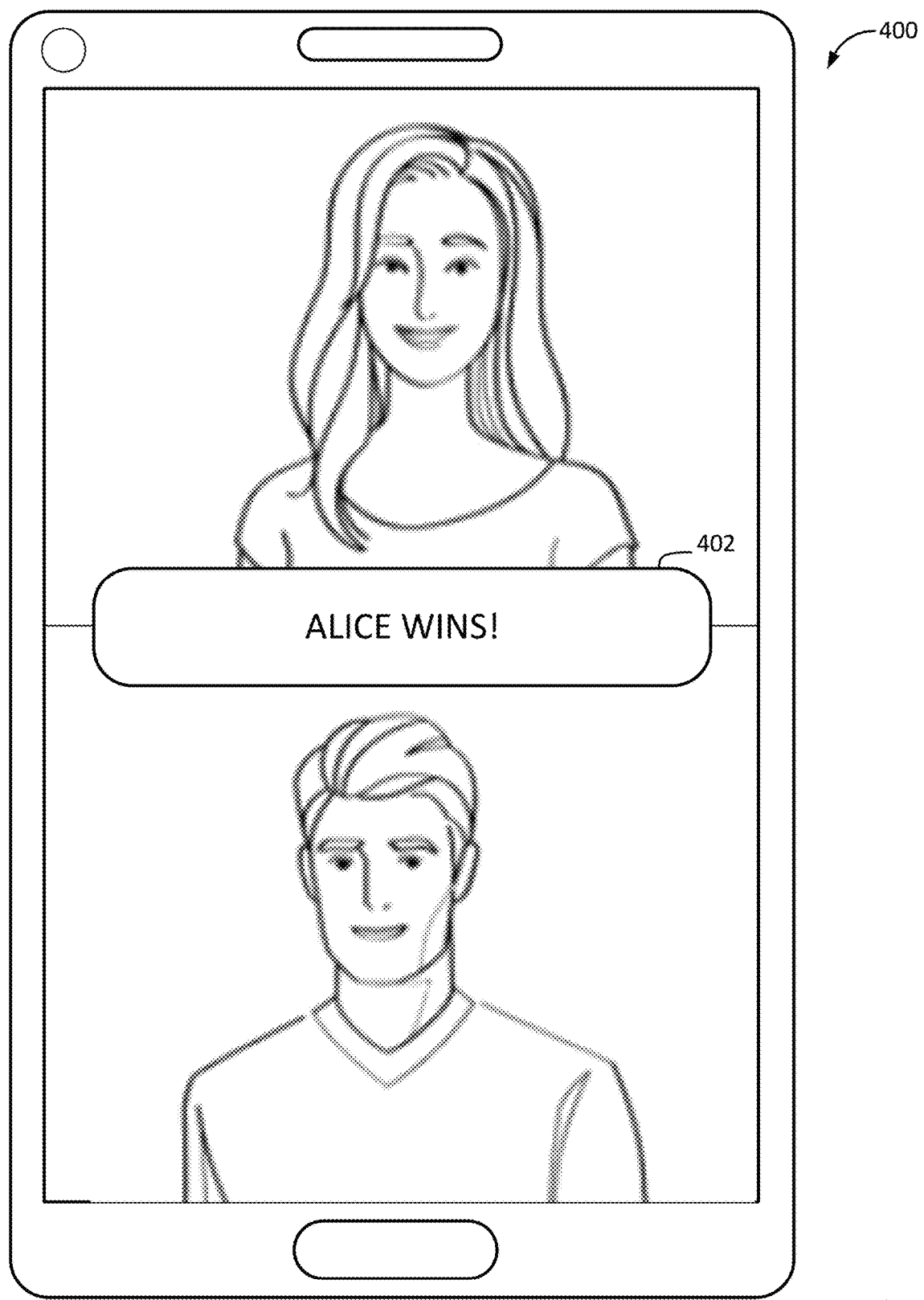
FIG. 4 illustrate an example implementation of a user interface, as may be used by a system configured to support a voice-controlled application, in accordance with one or more implementations.

FIG. 4 illustrates an example implementation of a user interface 400 as may be used by system 100, in accordance with one or more implementations. User interface 400 may enable or support the communication session (here, a video chat) between two users (say, "Alice", depicted in the top half of user interface 400, and "Bob", depicted in the bottom half of user interface 400). User interface 400 may include one or more (graphical) user interface elements, including a notification element 402 labeled "Alice wins!", which corresponds to the result of the challenge referred to for FIG. 3. The result of that challenge may have been based on voice information from Alice and/or Bob (e.g., Alice may guess the correct song title and/or Bob may guess the wrong song title). Similar user interfaces may be presented simultaneously to Alice and Bob on their respective computing devices.

Referring to FIG. 1, in some implementations, server(s) 102, client computing platform(s) 104, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which components may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 138 may include sources of information outside of system 100, external entities participating with system 100, external providers of computation and/or storage services, and/or other resources. In some implementations, some or all of the functionality attributed herein to external resources 138 may be provided by resources included in system 100. For example, information regarding challenges and/or results may be provided by external resources 138.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, and/or 116, and/or other components. Processor(s) 132 may be configured to execute components 108, 110, 112, 114, and/or 116, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 132 includes multiple processing units, one or more of components 108, 110, 112, 114, and/or 116 may be implemented remotely from the other components. The description of the functionality provided by the different components 108, 110, 112, 114, and/or 116 described below is for illustrative purposes only, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 132 may be configured to execute one or more additional components that may perform some or all of the functionality attributed below to one of components 108, 110, 112, 114, and/or 116.

Figure 2:
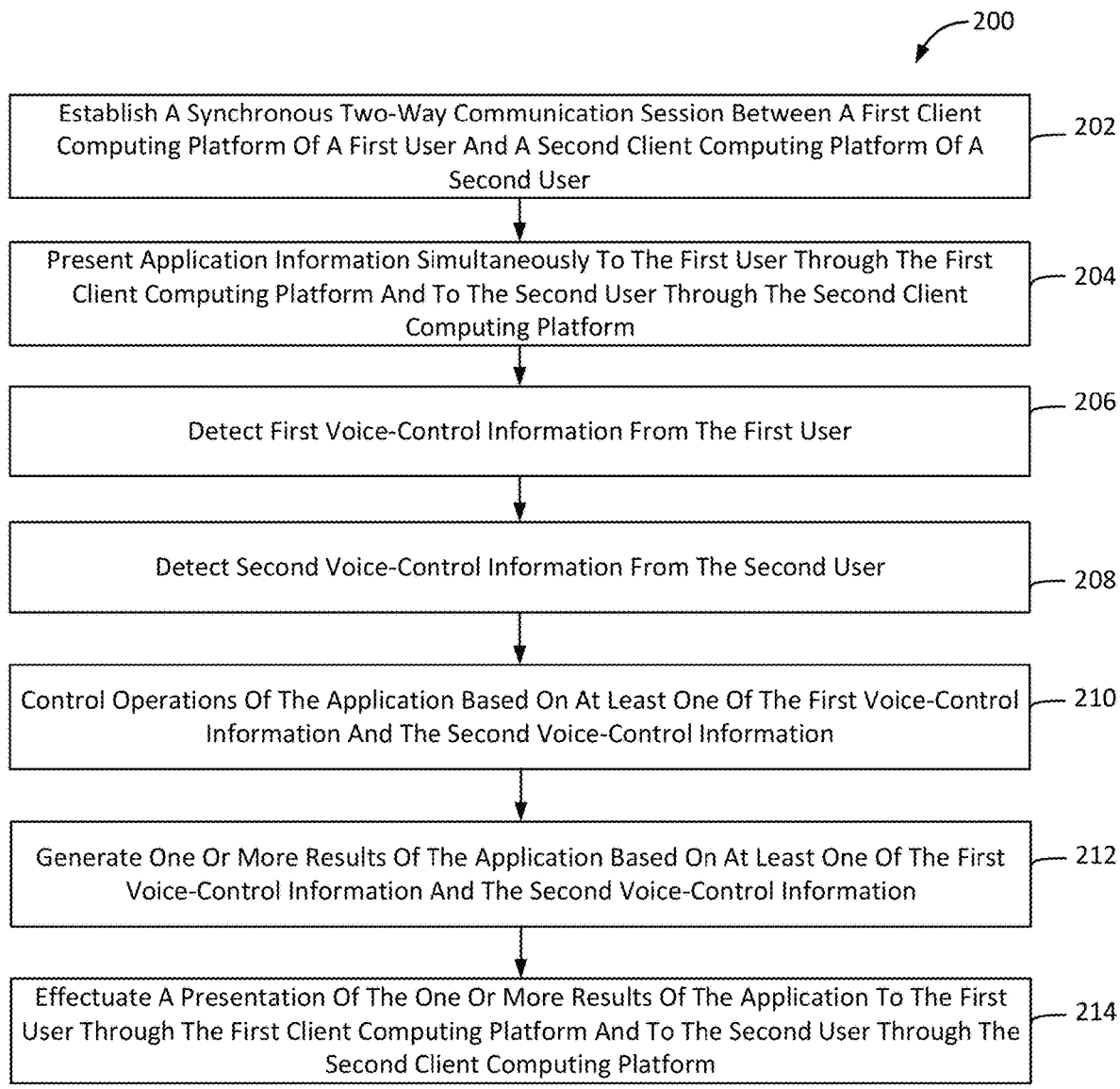
FIG. 2 illustrates a method of supporting a voice-controlled application, in accordance with one or more implementations.

FIG. 2 illustrates a method 200 of supporting a voice-controlled application, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a synchronous two-way communication session is established between a first client computing platform associated with a first user and a second client computing platform associated with a second user. In some embodiments, operation 202 is performed by a communication component the same as or similar to communication component 108 (shown in FIG. 1 and described herein).

At an operation 204, application information is presented (simultaneously) to the first user through the first client computing platform and to the second user through the second client computing platform. At least part of the application information represents a challenge to one or both of the first and second user. In some embodiments, operation 204 is performed by a presentation component the same as or similar to presentation component 110 (shown in FIG. 1 and described herein).

At an operation 206, first voice-control information from the first user is detected, within the synchronous two-way communication session. In some embodiments, operation 206 is performed by a voice-detection component the same as or similar to voice-detection component 112 (shown in FIG. 1 and described herein).

At an operation 208, second voice-control information from the second user is detected, within the synchronous two-way communication session. In some embodiments, operation 208 is performed by a voice-detection component the same as or similar to voice-detection component 112 (shown in FIG. 1 and described herein).

At an operation 210, operations of the application are controlled based on at least one of the first voice-control information and the second voice-control information. In some embodiments, operation 210 is performed by an operations component the same as or similar to operations component 114 (shown in FIG. 1 and described herein).

At an operation 212, one or more results of the application are generated based on at least one of the first voice-control information and the second voice-control information. In some embodiments, operation 212 is performed by an operations component the same as or similar to operations component 114 (shown in FIG. 1 and described herein).

At an operation 214, a presentation of the one or more results of the application is effectuated to the first user through the first client computing platform and to the second user through the second client computing platform. In some embodiments, operation 214 is performed by a presentation component the same as or similar to presentation component 110 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to support an application, wherein the application is voice-controlled, wherein the application is interactive between multiple users, wherein the application uses communications between the multiple users of the application, the system comprising:

one or more hardware processors configured by machine-readable instructions to:

present application information to a first user through a first client computing platform and to a second user through a second client computing platform, wherein at least part of the application information represents a challenge to one or both of the first and second user, wherein the application information includes audio information that is presented to the first user through the first client computing platform and to the second user through the second client computing platform, wherein the audio information is presented to the first user prior to being presented to the second user;

detect, within a communication session involving the first user and the second user, first voice-control information from the first user;

detect, within the communication session, second voice-control information from the second user;

control operations of the application based on at least one of the first voice-control information and the second voice-control information;

generate one or more results of the application, wherein the one or more results are based on at least one of the first voice-control information and the second voice-control information; and effectuate a presentation of the one or more results of the application to the first user through the first client computing platform.

2. The system of claim 1, wherein first audio information that has been captured by the first client computing platform is presented to the second user through the second client computing platform, and wherein second audio information that has been captured by the second client computing platform is presented to the first user through the first client computing platform.

3. The system of claim 1, wherein the first client computing platform includes a first microphone and a first loudspeaker, and wherein the first client computing platform is configured to capture the first audio information by the first microphone and to present at least some portion of the game information by the first loudspeaker.

4. The system of claim 1, wherein the application information includes a digital canvas configured to be drawn upon as part of the challenge.

5. The system of claim 1, wherein the audio information is a portion of a song, and wherein the challenge is based on recognizing one or both of an artist and/or a title of the song.

6. The system of claim 1, wherein the first client computing platform includes a first video camera and a first digital display, wherein the second client computing platform includes a second video camera and a second digital display, wherein the first client computing platform is configured to capture first video information by the first video camera, wherein the second client computing platform is configured to capture second video information by the second video camera, wherein the first client computing platform is configured to present at least some portion of the second video information through the first digital display, and wherein the second client computing platform is configured to present at least some portion of the first video information through the second digital display.

7. The system of claim 1, wherein the communication session includes two-way audio information and two-way video information.

8. The system of claim 1, wherein the one or more hardware processors are further configured to:

convert the first voice-control information into first textual information, wherein the operations of the application are based on the first textual information.

9. The system of claim 1, wherein the application is a software application, and wherein the operations of the application are controlled by a game engine.

10. A method of supporting an application, wherein the application is voice-controlled, wherein the application is interactive between multiple users, wherein the application uses communications between the multiple users of the application, the method comprising:

presenting application information to a first user through a first client computing platform and to a second user through a second client computing platform, wherein at least part of the application information represents a challenge to one or both of the first and second user, wherein the application information includes audio information that is presented to the first user through the first client computing platform and to the second user through the second client computing platform, wherein the audio information is presented to the first user prior to being presented to the second user;

detecting, within a communication session involving the first user and the second user, first voice-control information from the first user;

detecting, within the communication session, second voice-control information from the second user;

controlling operations of the application based on at least one of the first voice-control information and the second voice-control information;

generating one or more results of the application based on at least one of the first voice-control information and the second voice-control information; and effectuating a presentation of the one or more results of the application to the first user through the first client computing platform.

11. The method of claim 10, wherein first audio information that has been captured by the first client computing platform is presented to the second user through the second client computing platform, and wherein second audio information that has been captured by the second client computing platform is presented to the first user through the first client computing platform.

12. The method of claim 10, wherein the first client computing platform includes a first microphone and a first loudspeaker, and wherein the first client computing platform captures the first audio information by the first microphone and to present at least some portion of the game information by the first loudspeaker.

13. The method of claim 10, wherein the application information includes a digital canvas configured to be drawn upon as part of the challenge.

14. The method of claim 10, wherein the audio information is a portion of a song, and wherein the challenge is based on recognizing one or both of an artist and/or a title of the song.

15. The method of claim 10, wherein the first client computing platform includes a first video camera and a first digital display, wherein the second client computing platform includes a second video camera and a second digital display, wherein the first client computing platform captures first video information by the first video camera, wherein the second client computing platform captures second video information by the second video camera, wherein the first client computing platform presents at least some portion of the second video information through the first digital display, and wherein the second client computing platform presents at least some portion of the first video information through the second digital display.

16. The method of claim 10, wherein the communication session includes two-way audio information and two-way video information.

17. The method of claim 10, further comprising:
converting the first voice-control information into first textual information, wherein the operations of the application are based on the first textual information.

18. The method of claim 10, wherein the application is a software application, and wherein the operations of the application are controlled by a game engine.

* * * * *